(12) United States Patent
Constantinof et al.

(10) Patent No.: US 6,381,246 B1
(45) Date of Patent: Apr. 30, 2002

(54) TELEPHONY SYSTEM AND METHOD OF SIGNALLING

(75) Inventors: Cristian Constantinof, Kanata; Klaas Van Weringh, Ottawa, both of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/172,996

(22) Filed: Oct. 16, 1998

(30) Foreign Application Priority Data

Nov. 19, 1997 (CA) .............................................. 2221546

(51) Int. Cl.[7] .................................................. H04J 3/12
(52) U.S. Cl. ........................................ 370/410; 370/524
(58) Field of Search .................................. 370/395, 396, 370/397, 398, 399, 400, 401, 402, 403, 404, 405, 410, 422, 426, 466, 467, 360, 522, 524; 379/219, 229, 230, 231, 232, 240

(56) References Cited

U.S. PATENT DOCUMENTS

| | | | | |
|---|---|---|---|---|
| 5,425,026 A | * | 6/1995 | Mori .......................... | 370/410 |
| 5,483,527 A | * | 1/1996 | Doshi et al. ................ | 370/399 |
| 5,568,475 A | * | 10/1996 | Doshi et al. ................ | 370/399 |

* cited by examiner

Primary Examiner—Kwang B. Yao
(74) Attorney, Agent, or Firm—Allan P. Millard

(57) ABSTRACT

A telecommunication system and method of signalling are disclosed which enable service providers to integrate broadband network capability into their existing narrow band networks while being substantially transparent to existing narrow band signalling infrastructures such as the Common Channel Signalling System Number 7 (CCS7), currently in use. Significant advantages are realized through such a network system. Service providers, for example incumbent local exchange carriers (ILECs) now have access to BB connectivity while retaining the use of their extensive CCS7 signalling networks and Advanced Intelligent Network (AIN) resources. Investment in the CCS7 signalling infrastructure is hence not lost and the proven robustness and reliability of these networks is retained. Service providers can continue to take advantage of Intelligent Network capabilities in providing a large variety of voice services, but also to make available some of the current service features for future BB services. Furthermore each network is virtually independent of the other and can evolve as such. Telephony service call related signalling is able to be kept separate from the broadband network connectivity signalling thus allowing service providers to evolve their service specific signalling requirements independently of whatever BB networks are used now or in the future.

12 Claims, 4 Drawing Sheets

Fig. 4
Mapping Tables

| Trunk (CIC) | VC (VPI, VCI) | | VC (VPI, VCI) | VC (VPI, VCI) | | VC (VPI, VCI) | VC (VPI, VCI) | | VC (VPI, VCI) | Trunk (CIC) |
|---|---|---|---|---|---|---|---|---|---|---|
| 12 | (23, 17) | | (23, 17) | (13, 32) | | (13, 32) | (16, 25) | | (16, 25) | 12 |
| A | | | B | | | C | | | D | |

TELEPHONY SYSTEM AND METHOD OF SIGNALLING

FIELD OF INVENTION

This invention relates to telephony networks and to methods of signalling.

BACKGROUND TO THE INVENTION

Data traffic has been growing at unprecedented rates over the last few years in both the corporate and the residential sectors. The introduction of the Internet to the general public has generated an increased demand for higher-speed access from residences across network. The business community has not only seen growth in data traffic but also experienced a diverse change in service requirements.

The demand for data services has resulted in the proliferation of Internet Service Providers (ISP) deploying high bandwidth networks. As the competition between them increases, the ISPs are beginning to carry voice traffic over their networks, and will bundle data and voice services to increase account control on end-users. They are thus entering into direct competition with traditional telephone service-providers whose voice networks are being overwhelmed by the explosion of data traffic over a narrow band Time Division Multiplexed (TDM) network infrastructure that was not intended for, nor is capable of supporting such dramatic changes in traffic patterns and capacity.

In the United States, the 1996 Telecommunications Act has far-reaching implications on how telecommunications will be offered in the future. Local Exchange Carriers (LEC) now have the opportunity to enter new markets and generate new revenue streams by expanding their voice service portfolio to include long distance services and out-of-region local services. From a network implementation perspective, the traditional incumbent service providers (LECs) have the opportunity in new market segments, to deploy new networks specifically designed and engineered to satisfy the new broadband requirements of their customers. However, at the same time there will also be increased pressure on the incumbent service-providers to protect their existing market base from new entrants attempting to target their prime customers in major urban centers where extensive TDM based narrow band networks are in existence. New entrants will differentiate their services by offering lower cost, faster deployment, and enhanced service capabilities through advanced broadband architectures such as Asynchronous Transfer Mode (ATM). In order to defuse this competitive threat, there is a need for incumbent service-providers to cost effectively enhance their TDM based narrow band networks to achieve similar efficiencies, bandwidth capabilities and service flexibility.

A current standard (International Telecommunication Union-Telecommunication Standardization Sector Recommendation Q.2660) specifies how service providers shall provide signalling protocol conversion functionality at the interface between their existing TDM narrow band network and an ATM broadband network. The recommended protocol conversion is between the existing ISUP protocol currently used in Common Channel Signaling number 7 (CCS7) for call connection and call control, and the new Broadband ISUP (B-ISUP) protocol intended for use with ATM networks. Current versions of the B-ISUP protocol lack many of the call parameters available to ISUP and which are required by many voice services offered today. If this was the only problem associated with protocol conversion, industry could simply enhance and evolve B-ISUP to include all the call parameters of the existing ISUP protocol. However, protocol conversion becomes challenging as very often there are many different versions of the same protocol; for example to meet individual country requirements. This introduces complexity and expense at the vendor level, service providers level and even the installer level in ensuring that the correct protocol conversion is occurring at the right place. Another potential problem area for service providers is that even though B-ISUP may be a standards protocol it will likely not be ubiquitous throughout ATM networks. As B-ISUP has been modeled for telephony it is not likely to be ubiquitous for the simple reason that many ATM networks will be designed and installed solely for data and hence will not therefore have a requirement for all the features and complexity of B-ISUP.

Conversion to other protocols such as the ATM Private Node to Node Interface (PNNI) protocol would not be desirable at this point in time since it does not support the telephony features of ISUP.

SUMMARY OF THE INVENTION

The invention seeks to provide an improved method of signaling.

In accordance with one aspect of the invention there is provided a method of signaling in a system comprising a broadband network, a narrow band network containing an originating and terminating switching node interconnected through a signaling network for processing call control messages between the originating and terminating switching nodes, an originating and terminating network access point at the boundary of the narrow band and broadband networks, for respectively interfacing the originating and terminating switching nodes to the broadband network, and mapping and translatioin means connected to the originating switch, signaling network and originating network access point, the method comprising the steps of: sending a call control message over the narrow band netwok from an originating switch to a terminating switch, the call control message having a narrowband trunk identifier to indicate to the terminating switch a trunk for receiving corresponding call related data; and in response to the narrowband network call control message, sending the narrowband trunk identifier through the mapping and translating means and over the broadband network, from the originating network access point to the terminating network access point, for use by the terminating network access point in mapping call related data to the trunk corresponding to the trunk identifier.

Preferably, the broadband network is an asynchronous transfer mode (ATM) broadband network and the signaling network is a common channel signaling system number 7 (CCS7).

More preferably, the step of sending the narrowband trunk identifier over the broadband network comprises inserting the trunk identifier into the Calling Party Sub-Address Information Element of the Sub-Address Field of an ATM setup control message. Additionally, the narrowband trunk identifier comprises the originating point code, destination point code and the originating circuit identification code contained in an ISUP initial address message.

Significant advantages are realized through through such a network system. Service providers, for example incumbent local exchange carriers (ILECs) now have access to BB connectivity while retaining the use of the extensive CCS7 signalling networks and Advanced Intelligent Networks resources. Investment in the CCS& signaling infrastructure is hence not lost and the proven robustness and reliability of these networks is retained. Local exchange carriers can continue to take advantage of Intelligent Network capabilities in providing a large variety of voice services, but also to make available some of the current service features for future BB services. Further more each network is virtually independent of each other and can evolve as such. Telephony service call related signaling is kept separate from the broadband network connectivity signaling thus allowing service providers to evolve their service specific signaling requirements independently of whatever BB networks are used now or in the future.

BRIEF DESCRIPTION OF THE DRAWINGS

The invention will be further understood with reference to the drawings in which:

FIG. 4 illustrates example mapping tables associated with system elements of FIG. 3.

DETAILED DESCRIPTION

Figure 1:
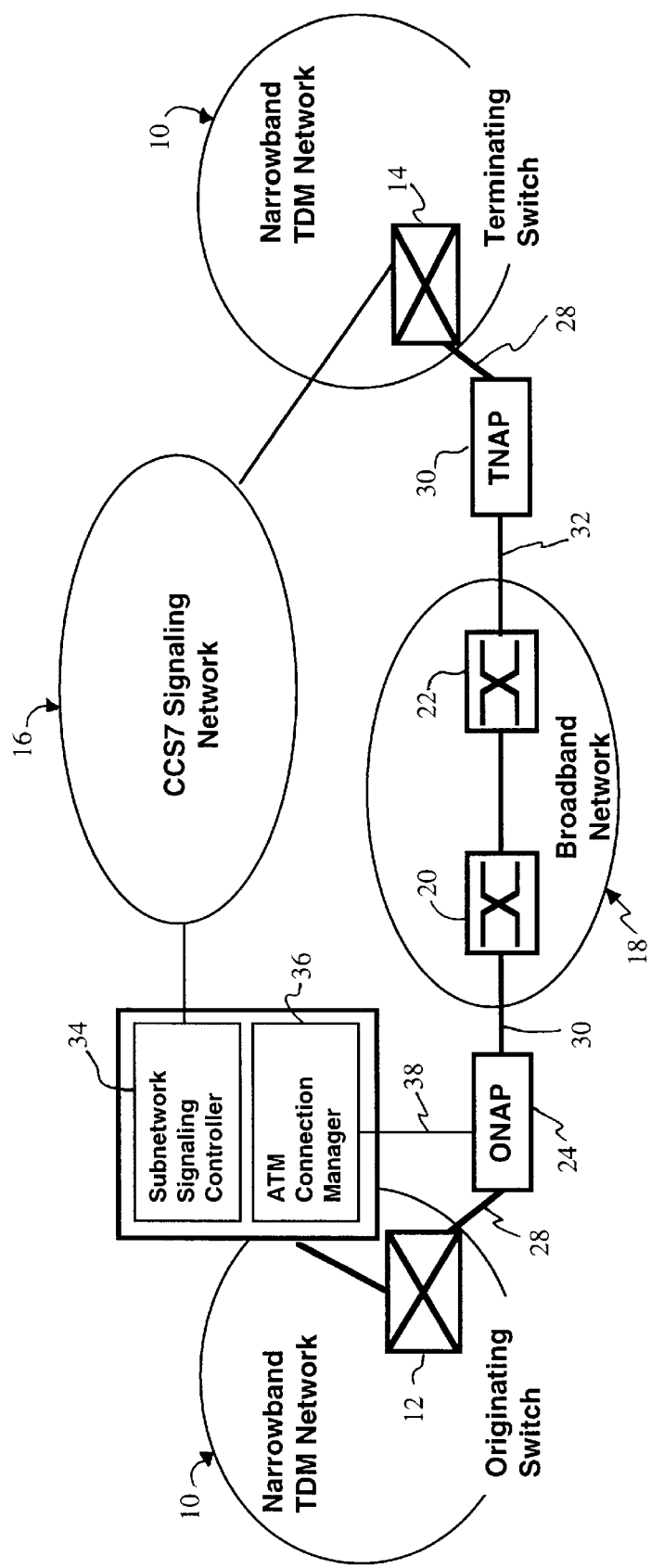
FIG. 1 illustrates a system according to a 1st embodiment of the invention.
Figure 2:
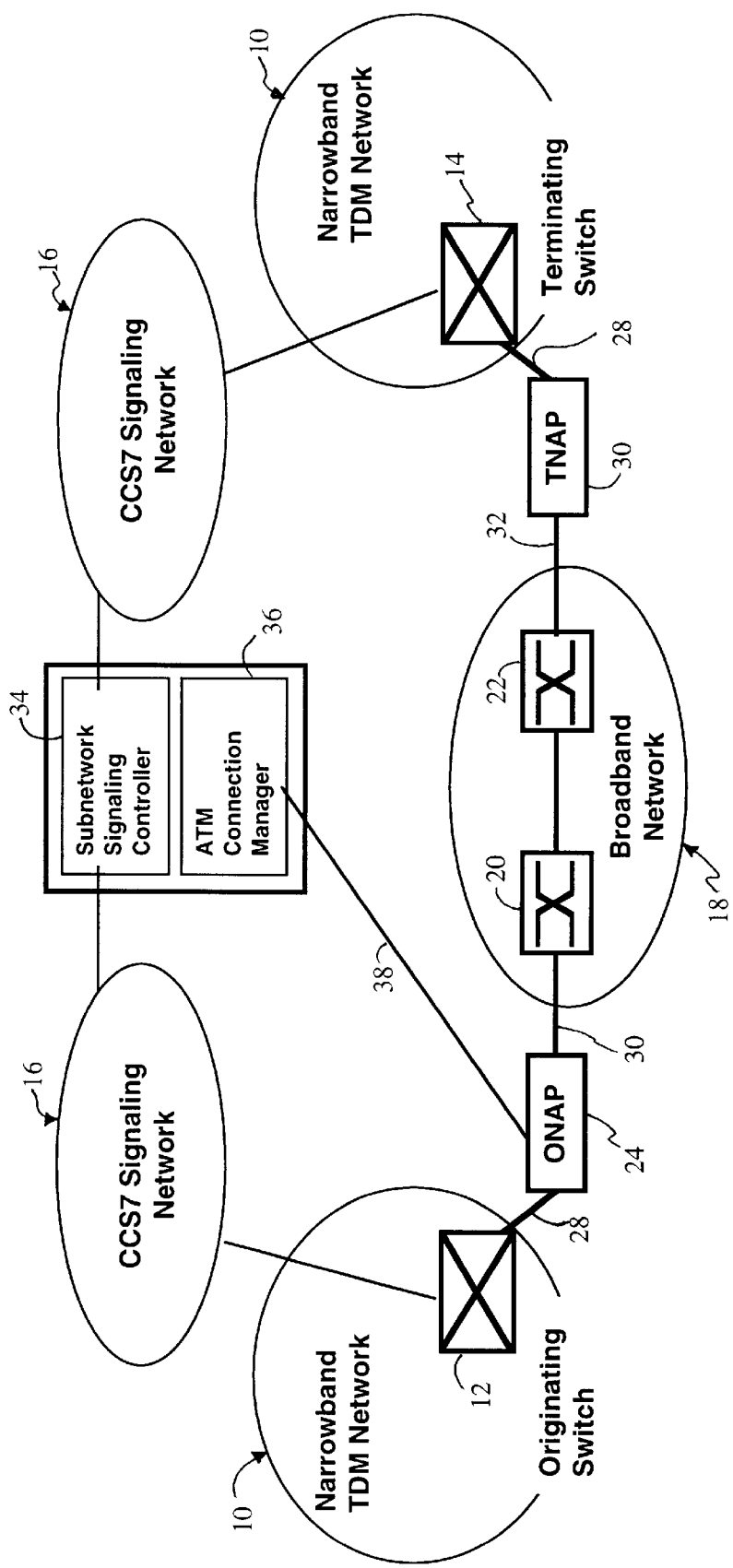
FIG. 2 illustrates a system according to a 2nd embodiment of the invention.
Figure 3:
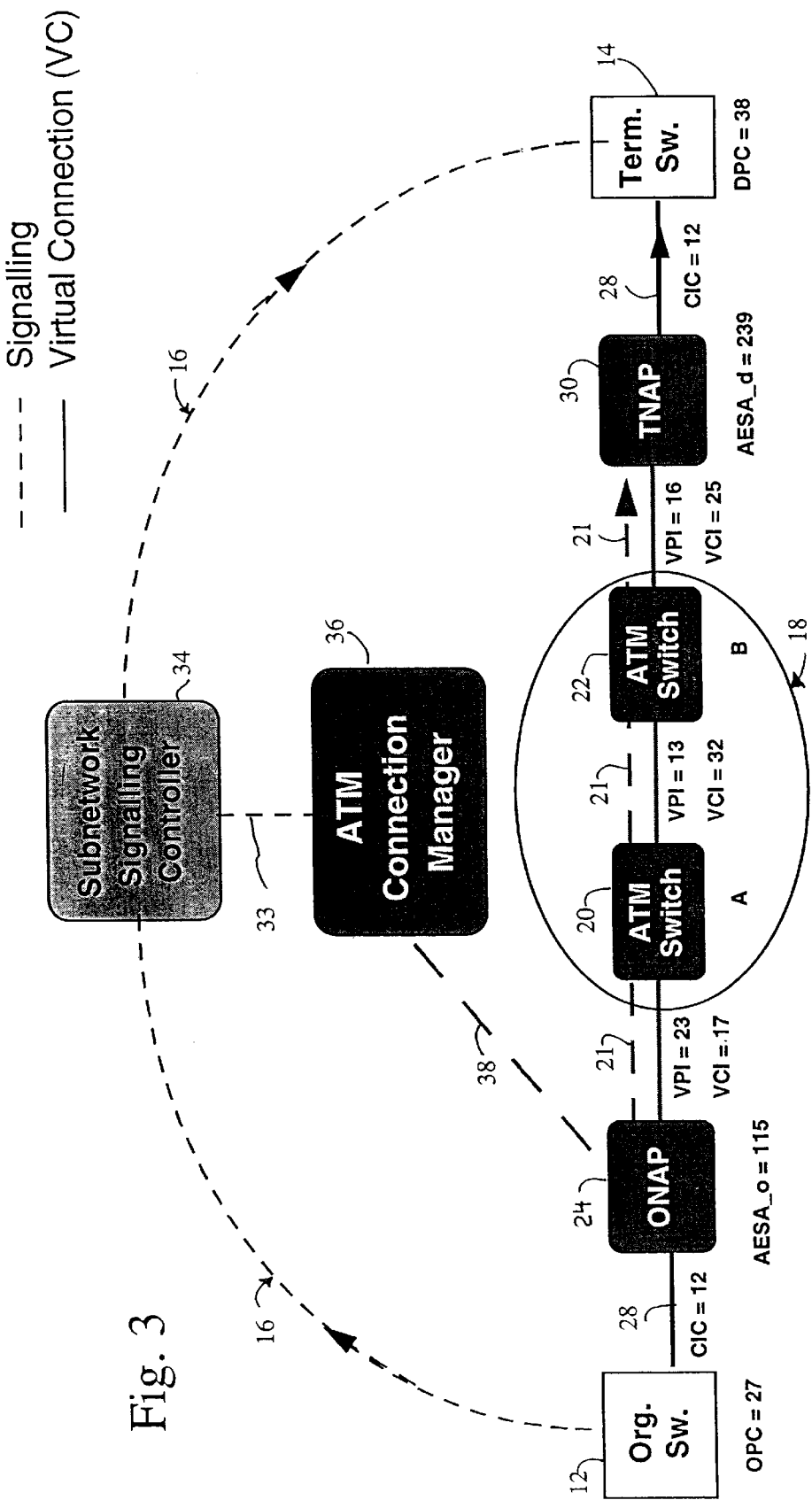
FIG. 3 illustrates in more detail a system functional level of the embodiment of FIGS. 1.

FIGS. 1 & 2 will be discussed at a high level to gain an appreciation of two embodiments of the invention and FIGS. 3 & 4 will be discussed in more detail to further appreciate operation details.

FIG. 1 illustrates a first embodiment of the invention which will allow service providers who currently have extensive time division multiplexed (TDM) narrow band (NB) network infrastructures to enhance these networks to provide for broadband (BB) capabilities while still utilising existing robust CCS7 signalling networks.

Some existing ATM protocols comply to industry standards for providing interworking between telephony TDM and ATM environments using Single Channel Adaptation (SCA). Single channel adaptation allows for octets belonging to individual TDM 64 kbit/s channels to be mapped into the payload of ATM cells belonging to a particular end to end Virtual Channel Connection (VCC). Single Channel Adaptation provides the advantage of mapping a voice connection essentially to an ATM cell stream which can then be manipulated by ATM switches. Single Channel Adaptation can be implemented with either industry standard AAL1 or AAL5 adaptation layer protocols and is compatible with industry proposed methods for providing voice over ATM networks to a subscriber desktop. Although not intended to be used with a separate signalling system such as CCS7 as illustrated in FIG. 1, advantageous use can be made of SCA compliant protocols in an ATM network where coordination between trunking information sent and received in ISUP call control messages and nodes making up an end to end Virtual Channel Connection, can be achieved.

With reference to FIG. 1, a first embodiment of a system according to the invention is illustrated. Cloud 10 represents a NB TDM network having an originating switch 12 and a terminating switch 14. The originating switch 12 and the terminating switch 14 are connected in conventional manner through a Common Channel Signalling #7 (CCS7) signalling network 16. The CCS7 network 16 handles in known manner, call control signalling messages including initial call set-up messages such as initial address messages (IAM) between the originating switch 12 and the terminating switch 14. An asynchronous transfer mode (ATM) network 18 is a preferred example of a BB connectivity network which ultimately provides a flexible high bandwidth data network between the originating and terminating switches 12,14. On the boundary of the NB network 10 and the ATM BB network 18 are located an originating network access point ONAP 24 and a terminating network access point TNAP 26 which respectively interface the originating and terminating switches 12,14 to the ATM BB network 18. Each NAP 24,26 interfaces to respective switches 12,14 over TDM bearer trunks 28 and to the ATM BB network 18 over links 30,32 which are consistent with protocols used by the ATM BB network 18. Signalling for connection control for the establishment of a bearer channel between communicating NAPs 24,26, takes place over ATM switches 20,22 using ATM protocols.

Additional functionality identified in FIG. 1 as a subnetwork signalling controller (SSC) 34 and an ATM connection manager 36 are conveniently shown housed in one block and would generally be located within the same end office as the originating switch 12. For purposes of understanding the embodiment, like functionality (34,36) has not been shown to be present at the terminating switch 14 but is understood to be present to handle calls originating at switch 14, i.e. in the reverse direction. Logically the SSC 34 interfaces with the CCS7 network 16 to be able to have access to ISUP initial address messages (IAMs). Within the ISUP protocol, IAMs which are sent over the CCS7 network comprise such information as the Called Party Number, Calling Party Number, the Originating Point Code (OPC) of the originating switch, and the Circuit Identification Code (CIC) which identifies the output originating switch trunk 28 to be used for a particular call associated with the IAM. For each IAM, the SSC 34 through mapping and translations of data contained within the IAM (to be described in more detail with reference to FIG. 3 & 4) provides data to the ATM Connection manager 36 regarding the ATM End System Addresses (AESA) of the originating NAP 24 and the terminating NAP 30, the originating and destination Point Codes (OPC & DPC) of the originating and terminating switches (12,14) as well as the CIC used by the originating switch 12 for the particular call associated with the IAM. The IAM continues on unaltered over the CCS7 signalling network 16 towards its destination, the terminating switch 14. The ATM Connection Manager 36 sends a request to the Originating NAP 24 over link 38 to set up an ATM Virtual Channel Connection (VCC) between the ONAP 24 and the TNAP 30 to provide a virtual bearer connection for the call associated with the IAM. included in the ATM Q.2931 SETUP message sent by the ONAP 24 is trunk information to be stored and used at the TNAP to co-ordinate correct TDM trunk alignment between the TNAP 30 and the terminating switch 14.

The system configuration illustrated in FIG. 1 is an example embodiment for local high usage areas such as a metro region where originating switches would have knowledge of destination point codes of terminating switches. In these instances tandem switches are not encountered in the signalling route thus resulting in the network trunk circuit identification sent in the initial address message (IAM) arriving at a terminating switch unaltered or changed. FIG. 2 illustrates a variation of the example embodiment of FIG. 1 and differs only in the placement of the Subnetwork Signalling Controller (SSC) 34 and the ATM Connection Manager 36. Identical feature numbers found in FIG. 1 and 2 represent identical elements. FIG. 2 is illustrative of a system where originating switches are unable to determine the destination point code DPC of the terminating switch associated with the called party number. In these cases the IAM message is routed to the SSC 34 which now functions also as a tandem switch where the DPC can be determined. Within the IAM, the DPC of the tandem switch is then replaced with the DPC of the terminating switch and the CIC value is updated with the Tandem switch output trunk value before the IAM is forwarded on. To ensure proper trunk alignment at the terminating end, the SSC 34 sends the Tandem switch output trunk CIC value to the Originating NAP 24 to be sent in the ATM Q.2931 SETUP Message. The operation is otherwise identical to the description associated with FIG. 1.

To further appreciate the operation of the systems of FIGS. 1 or 2, a example signalling walk through for a sample call will be detailed with reference to FIGS. 3 & 4. FIG. 3 illustrates an example signalling flow for a call set-up between an originating and a terminating switch of the system of FIGS. 1. Features in FIG. 3 having the same feature numbers as found in FIG. 1 and 2 represent identical elements. The CCS7 signalling network 16 is represented in FIG. 3 not as a cloud but as a dotted line.

Mapping tables A,B,C,D illustrated in FIG. 4 are associated with respectively, the Originating NAP 24, ATM switch 20, ATM switch 22 and the Terminating NAP 30.

For an example call the originating switch 12 seizes a TDM trunk 28 identified by CIC=12, between itself and the Originating NAP 24. An IAM comprising a Called Party Number field, an OPC field and a CIC field is made available to the Subnetwork Signalling Controller 34. The Subnetwork Signalling Controller 34 using either local or remote lookup tables, translates the Called Party Number to a DPC=38 which is the point code of the terminating switch associated with the Called Party Number. The IAM parameter OPC=27 of the originating switch and the associated CIC=12 together are mapped to an Originating ATM End System Address (AESA)=115 which corresponds to the Originating NAP 24. The translated DPC=38 along with the CIC parameter=12 are mapped to a Destination ATM End System Address (AESA)=239 which corresponds in this example to the Terminating NAP 30. The SSC 34 over link 33 sends a request to the ATM Connection Manager 36 for a Virtual Channel Connection (VCC) between ATM End System Addresses contained in the request. The request would contain data: Originating AESA=115, Destination AESA=239, OPC=27, DPC=38, and CIC=12. A corresponding IAM is forwarded over the CCS7 signalling network 16 with the following parameters: Called Party Number=X, Calling Party Number=Y, OPC of Originating NAP=24, DPC of Terminating Switch=38, CIC=12. The ATM Connection Manager 36 forwards the request which includes the OPC and CIC values over link 38 to the Originating NAP 24. The Originating NAP then sends an ATM Q.2931 protocol standard SETUP message over ATM signalling link 21 to request the set up of a Virtual Channel Connection to the Terminating NAP 30. The Q.2931 ATM SETUP message comprises a Calling Party Sub-Address Information Element having a maximum length of 25 octets. The value of the Calling Party Sub-Address Information field is set by the Originating NAP 24 to contain the OPC=27 and CIC=12 values. This information will be stored and used by the Terminating NAP 30 to output call related data onto the correct TDM trunk to the Terminating Switch 14. The OPC and CIC values are not ATM addresses and so as not to confuse the ATM network the 'Type of Sub-Addresses' field of the Q.2931 ATM SETUP message Calling Party Sub-Address Information Element is set to 'User Specified' by the Originating NAP 24.

As a result of the ATM SETUP message virtual channels will be set-up in known manner by the ATM BB network 18 between ATM nodes for the VCC between the ONAP 24 and TNAP 30 and each node will have a corresponding mapping table associated with its Virtual Channel. FIG. 4 illustrates an example of four mapping tables, A,B,C,D which represent respectively virtual channel mapping at the ONAP 24, ATM Switch 20, ATM Switch 22 and TNAP 30. Virtual channel links between the above nodes are shown as solid lines. The Origination NAP 24 as per Table A of FIG. 4 will map TDM trunk 12 on link 28 to Virtual Channel (VC) having Virtual Path Identifier (Vpi)=23 and Virtual Channel Identifier (Vci)=17. Similarly ATM switch 20 will map incoming VC identified by Vpi=23 and Vci=17 to outgoing VC identified by Vpi=13 and Vci=32 as per table B of FIG. 4. In a similar manner ATM switch 22 will map incoming VC identified by Vpi=13 and Vci=32 to outgoing VC identified by Vpi=16 and Vci=25 to establish a VC to the Terminating NAP 30 having the ATM ESA=239. For the Terminating NAP 30 to correctly construct its mapping table it uses the trunk information it received in the Calling Party Sub-Address Information Element of the ATM SETUP message. Accordingly in this example the Terminating NAP 30 maps the incoming VC identified by Vpi=16 and Vci=25 to outgoing TDM trunk associated with OPC=27 and CIC=12. The reader will recall, as previously explained for a system configuration according to FIG. 2 where the Originating NAP 24 is unaware of the DPC for the Terminating Switch 14, the Subnetwork Signalling Controller 34, acting as a tandem switch will forward a new CIC value in the IAM and will also send the new CIC value via the ATM Connection Manager 36 to the Originating NAP 24 to be included in the ATM SETUP request message. In response to the Terminating Switch 14 receiving the IAM it will reserve trunk resources corresponding to OPC=27 and CIC=12 values in the IAM. The end to end virtual bearer connection is now established as the Terminating NAP 30 has used the trunk information it received (OPC=27,CIC=12) in the Calling Party Sub-Address Information Element field to correctly map call data to the same TDM trunk reserved by the terminating Switch 14.

At some point in time one party on a call ends the call and the system must then tear down the call, i.e. release network resources. Either party on a call may end the call and hence either the originating or the terminating switch may initiate call tear down. Where the originating end initiates call tear down the originating switch 12 causes in known manner an ISUP Release message to be created and sent over the CCS7 signalling network 16 to the terminating switch 14. In a similar manner as for IAMs the SSC 34 interfaces with the CCS7 network 16 to also have access to ISUP Release messages which comprise the same information as was identified earlier for the IAMs. In a similar manner as for setting up resources, the originating NAP 24 now sends a standard Q.2931 RELEASE message identifying appropriate ATM end system addresses and clears its mapping table entries for the VC associated with the trunk identified in a release request sent by the ATM Connection Manager 36. As the Q.2931 RELEASE message travels across the ATM network each switch within the network 20,22 clears respective mapping table entries for their VC portion of the VCC. In the example of FIG. 3, switch 20 would clear table entries identified in table B of FIG. 4 and switch 22 would clear table entries identified in table C of FIG. 4. When the RELEASE message is received at the TNAP 30 it clears its associated table entry; for example table D of FIG. 4. Additional TDM related information such as trunking information need not be included in the standard RELEASE message.

Where the terminating switch initiates call tear down the TNAP 30 in a similar manner clears its mapping tab entry and sends the standard Q.2931 RELEASE message backwards through the network. Switches 22,20 and ONAP 24 then clear their mapping table entries associated with the VCC.

Other means for passing originating trunking information over the ATM BB network to the TNAP 30 are contemplated by the applicant. The embodiments just described pass on the trunking information (OPC & CIC) in a signalling control message such as the Calling Party Sub-Address Information Element of the ATM Q.12931 protocol standard SETUP message. The trunking information could also be mapped onto the Calling Party Number Information Element of the ATM Q.2931 SETUP message used to establish the end to end VCC. To avoid potential ATM addressing confusion using this technique, the Type of Number field should be set to 'network specific number' and the Numbering Plan field should be set to 'private numbering plan'.

A further means is contemplated by the applicant where the trunking information is mapped to the Virtual Channel Connection Identifier Information Element which is a lower layer information element within the ATM Q.2931 SETUP message.

Yet a further means is contemplated which does not make use of ATM signalling control messages such as the Q.2931 SETUP message. Instead of sending the trunking information as part of a control message it is sent over the same virtual channels used to send actual voice data. This technique requires a protocol such as the standard AAL2 protocol which allows for multiple sub-channels within one VCC. Using this technique one channel would be used to carry the trunking information for signalling or mapping purposes at the TNAP 30. The sub-channel would thus carry messages identifying the mapping between the narrowband trunk and the Virtual Sub-channel resources to be used for carrying the call related data. Using the sub-channel in this manner would provide an ONAP 24 to TNAP 30 signalling channel. Using a dedicated sub-channel in this manner allows the receiving entity (i.e. the TNAP 30) to distinguish the trunk information from actual voice data.

Significant advantages are realized through such a network system. Service providers, for example incumbent local exchange carriers (ILECs) now have access to BB connectivity while retaining the use of their extensive CCS7 signalling networks and Advanced Intelligent Network (AIN) resources. Investment in the CCS7 signalling infrastructure is hence not lost and the proven robustness and reliability of these networks is retained. Service providers can continue to take advantage of Intelligent Network capabilities in providing a large variety of voice services, but also to make available some of the current service features for future BB services. Further more each network is virtually independent of the other and can evolve as such. Telephony service call related signalling is able to be kept separate from the broadband network connectivity signalling thus allowing service providers to evolve their service specific signalling requirements independently of whatever BB networks are used now or in the future.

We claim:

1. A method of signaling in a system comprising a broadband network, a narrow band network containing an originating and terminating switching node interconnected through a signaling network for processing call control messages between the originating and terminating switching nodes, an originating and terminating network access point at the boundary of the narrow band and broadband networks, for respectively interfacing the originating and terminating switching nodes to the broadband network, and mapping and translation means connected to the originating switching node, signaling network and originating network access point, the method comprising the steps of:

sending a call control message over the narrow band network from an originating switching node to a terminating switching node, the call control message having a narrowband trunk identifier to indicate to the terminating switching node a trunk for receiving corresponding call related data; and in response to the narrowband network call control message, sending the narrowband trunk identifier through the mapping and translating means and over the broadband network, from the originating network access point to the terminating network access point, for use by the terminating network access point in mapping call related data to the trunk corresponding to the trunk identifier.

2. A method as claimed in claim 1 wherein the step of sending the narrowband trunk identifier over the broadband network comprises sending the trunk identifier in a broadband signaling control message.

3. A method as claimed in claim 2 wherein the step of sending the narrowband trunk identifier over the broadband network comprises sending the trunk identifier in an ATM setup control message.

4. A method as claimed in claim 3 wherein the step of sending the narrowband trunk identifier over the broadband network comprises inserting the trunk identifier into the Calling Party Sub-Address Information Element of the Sub-Address Field of an ATM setup control message.

5. A method as claimed in claim 1 wherein the step of sending the narrowband trunk identifier over the broadband network comprises sending the trunk identifier over the same virtual channels as used for call related voice data.

6. A method as claimed in claim 5 wherein the step of sending the narrowband trunk identifier over the broadband network comprises sending the trunk identified sub-channel of the virtual channels.

7. A method as claimed in claim 2 wherein the trunk identifier comprises the originating point code, destination point code and the originating circuit identification code contained in an ISUP initial address message.

8. A method as claimed in claim 7 wherein the mapping and translating means acts as a tandem switch within the signaling network to determine the destination point code of the terminating switching node and update the ISUP initial address message with the determined destination point code.

9. A method as claimed in claim 2 wherein the broadband network is an asynchronous transfer mode (ATM) broadband network.

10. A method as claimed in claim 9 wherein the mapping and translating means comprises a subnetwork signaling controller and an ATM connection manager.

11. A method as claimed in claim 10 wherein the subnetwork signaling controller maps and translates data contained with an ISUP initial addresss message and provides the data to the ATM connection manager to define the ATM End System Addresses of the originating and terminating network access points, origination and destination point codes associated with the originating and destination switching nodes respectively, and an originating circuit identification code associated with the originating switching node and call in process.

12. A method as claimed in claim 2 wherein the signaling network is a common channel signaling system number 7 (CCS7).

* * * * *